US009414345B2

United States Patent
Larmo et al.

(10) Patent No.: US 9,414,345 B2
(45) Date of Patent: Aug. 9, 2016

(54) METHOD AND AN ARRANGEMENT FOR SHARING OF A FIRST CELL RADIO NETWORK TEMPORARY IDENTIFIER

(75) Inventors: Anna Larmo, Espoo (FI); Mats Sågfors, Kyrkslätt (FI); Riikka Susitaival, Helsinki (FI); Johan Torsner, Kyrkslätt (FI); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 433 days.

(21) Appl. No.: 13/825,028

(22) PCT Filed: Sep. 27, 2010

(86) PCT No.: PCT/SE2010/051036
§ 371 (c)(1),
(2), (4) Date: May 3, 2013

(87) PCT Pub. No.: WO2012/044211
PCT Pub. Date: Apr. 5, 2012

(65) Prior Publication Data
US 2013/0223370 A1  Aug. 29, 2013

(51) Int. Cl.
*H04W 60/00* (2009.01)
*H04W 76/02* (2009.01)
(Continued)

(52) U.S. Cl.
CPC .............. *H04W 60/00* (2013.01); *H04W 8/26* (2013.01); *H04W 74/00* (2013.01); *H04W 76/021* (2013.01); *H04W 4/005* (2013.01); *H04W 74/0841* (2013.01)

(58) Field of Classification Search
CPC ............ H04W 60/00; H04W 74/0841; H04W 76/021; H04W 4/005; H04W 8/26; H04W 74/00
See application file for complete search history.

(56) References Cited

U.S. PATENT DOCUMENTS

| 7,986,946 | B2 * | 7/2011 | Pettersson | H04W 24/00 370/241 |
| 2004/0264550 | A1 * | 12/2004 | Dabak | H04B 1/707 375/142 |

(Continued)

FOREIGN PATENT DOCUMENTS

| EP | 1973365 A2 | 9/2008 |
| WO | 2007052968 A1 | 5/2007 |

(Continued)

OTHER PUBLICATIONS

3GPP TSG RAN2#54 R2-062269, titled "Contention Resolution in Non-synchronous RACH Access" (R2-062269 hereinafter) was published as Agenda Item 11.3.4, 3GPP TSG RAN2#54, pp. 01-05 on Aug. 28-Sep. 1, 2006.*

(Continued)

*Primary Examiner* — Andrew Lai
*Assistant Examiner* — Hoyet H Andrews, III
(74) *Attorney, Agent, or Firm* — Murphy, Bilak & Homiller, PLLC

(57) ABSTRACT method and an arrangement (800) in a radio network node (140) for sharing of a first Cell Radio Network Temporary Identifier, referred to as "C-RNTI" between at least a first and a second communication device (110, 120) are provided. The radio network node (140) receives a first random access preamble from the first communication device (110). Furthermore, the radio network node (140) associates the first C-RNTI to the first communication device (110), in response to the first random access preamble. The radio network node (140) receives a second random access preamble from the second communication device (120). Moreover, the radio network node (140) associates the first C-RNTI to the second communication device (120), in response to the second random access preamble, while the association of the first C-RNTI to the first communication device (110) is maintained. A method and an arrangement (900) in a first communication device (110) for enabling sharing of a first Cell Radio Network Temporary Identifier between at least the first communication device (110) and a second communication device (120) are provided.

13 Claims, 7 Drawing Sheets

(51) Int. Cl.
*H04W 8/26* (2009.01)
*H04W 74/00* (2009.01)
*H04W 4/00* (2009.01)
*H04W 74/08* (2009.01)

(56) References Cited

U.S. PATENT DOCUMENTS

| | | | | |
|---|---|---|---|---|
| 2008/0096557 | A1* | 4/2008 | Rinne | H04W 8/26 455/435.1 |
| 2008/0165733 | A1* | 7/2008 | Xiao | H04W 72/1231 370/330 |
| 2008/0304410 | A1* | 12/2008 | Park | H04W 8/26 370/231 |
| 2010/0034162 | A1* | 2/2010 | Ou | H04L 1/1887 370/329 |
| 2010/0165950 | A1* | 7/2010 | Abeta | H04W 36/06 370/332 |

FOREIGN PATENT DOCUMENTS

| | | | | |
|---|---|---|---|---|
| WO | 2008038983 | A1 | 4/2008 | |
| WO | WO 2008042889 | A1 * | 4/2008 | H04W 74/002 |
| WO | 2009074062 | A1 | 6/2009 | |
| WO | 2009121025 | A2 | 10/2009 | |
| WO | WO 2009121025 | A2 * | 10/2009 | H04L 5/0053 |
| WO | 2010017913 | A1 | 2/2010 | |
| WO | 2010090440 | A2 | 8/2010 | |

OTHER PUBLICATIONS

3GPP TSG 22.368 (Mar. 2010), titled, "Service requirements for Machine-Type Communications (MTC); Stage 1" (Release 10) was published Mar. 2010.*

3GPP TS 36.212 V8.8.0 (Sep. 2011), titled 3rd Generation Partnership Project; Technical Specification Group Radio Access Network; Evolved Universal Terrestrial Radio Access (E-UTRA); Multiplexing and channel coding (Release 8) was published Dec. 2009.*

3GPP TS 36.321 V9.1.0 (Dec. 2009), titled 3rd Generation Partnership Project; Technical Specification Group Radio Access Network; Evolved Universal Terrestrial Radio Access (E-UTRA); Medium Access Control (MAC) protocol specification (Release 9).*

3GPP TS 36.321 V9.1.0 (Dec. 2009), titled "3rd Generation Partnership Project; Technical Specification Group Radio Access Network; Evolved Universal Terrestrial Radio Access (E-UTRA); Medium Access Control (MAC) protocol specification (Release 9)", (TS 36.321 hereinafter) was published Dec. 2009, pp. 01-48.*

3GPP TS 36.212 V8.8.0 (Sep. 2011), titled 3rd Generation Partnership Project; Technical Specification Group Radio Access Network; Evolved Universal Terrestrial Radio Access (E-UTRA); Multiplexing and channel coding (Release 8) was published Dec. 2009. 3GPP TS 36.212 V8.8.0 (Dec. 2009).*

3rd Generation Partnership Project. "Contention Resolution in Non-synchronous RACH Access." RAN2#54 , R2-062269, Aug. 28-Sep. 1, 2006, pp. 1-5, Tallinn, Estonia.

3rd Generation Partnership Project. "UE Identity Validity for connection message in RA Procedure." 3GPP TSG-RAN WG2 #59, R2-073112, Aug. 20-24, 2007, pp. 1-2, Athens, Greece.

3rd Generation Partnership Project. 3GPP TS 22.368 V1.0.0 (Aug. 2009). 3rd Generation Partnership Project; Technical Specification Group Services and System Aspects; Service requirements for machine-type communications; Stage 1 (Release 10), Aug. 2009, pp. 1-22.

3rd Generation Partnership Project. 3GPP TS 36.212 V8.7.0 (May 2009). 3rd Generation Partnership Project; Technical Specification Group Radio Access Network; Evolved Universal Terrestrial Radio Access (E-UTRA); Multiplexing and channel coding (Release 8), May 2009, pp. 1-60.

3rd Generation Partnership Project. 3GPP TS 36.321 V8.5.0 (Mar. 2009). 3rd Generation Partnership Project; Technical Specification Group Radio Access Network; Evolved Universal Terrestrial Radio Access (E-UTRA) Medium Access Control (MAC) protocol specification (Release 8), Mar. 2009, pp. 1-46.

3rd Generation Partnership Project. "New SI proposal: RAN Improvements for Machine-type Communications." 3GPP TSG-RAN #45, RP-090991, Sep. 15-18, 2009, pp. 1-5, Sevilla, Spain.

* cited by examiner

METHOD AND AN ARRANGEMENT FOR SHARING OF A FIRST CELL RADIO NETWORK TEMPORARY IDENTIFIER

TECHNICAL FIELD

The present disclosure relates to a method and an arrangement in a radio network node for sharing of a first Cell Radio Network Temporary Identifier between at least a first and a second communication device. Furthermore, the present disclosure relates to a method and an arrangement in a first communication device for enabling sharing of a first Cell Radio Network Temporary Identifier.

BACKGROUND

In recent years, it has become more and more common to use cellular radio communication systems for automatic exchange of information between devices for performing many different tasks, such as opening and closing of valves in for example a sewage system, measuring of temperature or pressure, updating of map information for a GPS-system in a car and more. This kind of automated communication, without user interaction, is often referred to as machine-to-machine (M2M) communication. As more and more devices, such as laptops, digital cameras, cars, outdoor thermometers, indoor thermometers, electricity meters and so on, become connected, the number of connections in the radio communication systems will increase drastically.

In Third Generation Partnership Project Long Term Evolution (3GPP LTE), all scheduling assignments, grants and commands are issued to specific Radio Network Temporary Identifiers (RNTI). The RNTI is a number between 0 and $2^{16}$. Different types of RNTIs exist, such as the Paging RNTI (P-RNTI), System Information RNTI (SI-RNTI), etc. For example, a communication device (or user equipment, "UE") that is reading e.g. System Information is looking for the commands assigned to the SI-RNTI on the Physical Downlink Control Channel (PDCCH). RNTIs can either be common to several communication devices, or unique to one specific communication device.

Specifically, the Cell RNTI (C-RNTI) is used to address a specific communication device in a connected state, such as RRC CONNECTED state in case of an LTE system. A communication device in RRC CONNECTED state has established a connection to a cellular radio communication network. Therefore, the communication device in RRC CONNECTED state needs at least one C-RNTI that is unique among the C-RNTIs assigned to other communication devices in RRC CONNECTED state in the same cell. Multiple RNTIs may be allocated to a communication device at the same time, i.e. in parallel. For example, a Semi-Persistent Scheduling RNTI (SPS-RNTI) may be assigned to a communication device in addition to the aforementioned C-RNTI.

The RNTIs in current LTE network are signalled by 16 bits, meaning that $2^{16}=65\ 536$ values are possible. However, in practice, it can be speculated that if allocations of RNTIs are very closely in the RNTI space (in terms of the Hamming distance), this would lead to a high probability of RNTI misdetection. If this is the case, it is possible that only a fraction of the current RNTI number space can be utilized in practice.

The following problems make the C-RNTI values limited:
all RRC connections need at least one RNTI, i.e. the C-RNTI,
only one connection can be identified with one C-RNTI, and
some connections may require multiple RNTIs.

Furthermore, as explained above, not all RNTI values are available for C-RNTI use, but only a subset (albeit a large one) is actually allocated for C-RNTIs.

In the following example, scheduling of a communication device on PDCCH (Physical Downlink Control Channel) using a C-RNTI as specified by 3GPP LTE is described. PDCCH is used for carrying e.g. downlink scheduling assignments and uplink scheduling grants. The assignments and grants include detailed information of PDSCH/PUSCH (Physical Downlink Shared Channel/Physical Uplink Shared Channel) resource indication, transport format, hybrid-ARQ (Automatic Repeat reQuest) information etc. A Cyclic Redundancy check (CRC) is attached to PDCCH payload, where the RNTI is included in CRC calculation. Upon on reception of PDCCH, the communication device will check the CRC using its unique C-RNTI. If the CRC matches, the communication device may conclude that the message is intended to it.

Consider the following scenario. It is assumed that data becomes available for transmission in the communication device, but the communication device does not have UL resources to transmit the data, even when the communication device is in the RRC CONNECTED state. Thus, the communication device requests resources with a Scheduling Request (SR) from a radio network node, such as an eNB. Then, the SR initiates a Random Access (RA) procedure if Physical Uplink Control Channel (PUCCH) resources are not allocated for transmission of the SR. In a contention based RA, the communication device selects a random preamble to be transmitted in Random Access Channel (RACH). For this case, the RA procedure is as follow:

The communication device transmits a random preamble selected by it on RACH (as noted above).

The radio network node responds with a RA Response (RAR) for the same preamble as transmitted by the communication device. RAR message includes a Scheduling Grant (SG) for an uplink transmission.

The communication device now responds to the RAR with a scheduled message 3 (as known from 3GPP-terminology) including a C-RNTI thus identifying the communication device.

The radio network node then replies with a Contention Resolution message. If the Contention Resolution message includes the same C-RNTI as the communication device has transmitted in message 3, the communication device regards the Random Access Procedure as successful.

The above described method is contention based, because two communication devices can request resources at the same time with the same preamble. In this case the radio network indicates by means of C-RNTI in Contention Resolution message which of the communication device succeeds with the random access.

The Discontinuous Reception (DRX) procedure, defined as a part of the LTE Medium Access Control (MAC), specifies time periods during which a communication device is obliged to monitor the PDCCH. In DRX, an active time is defined for this purpose. In time periods, specified as active time, the communication device is not allowed to go to a sleep state, which consumes less power. Active time is calculated based on specific DRX timers and cycles in such a way that the network and the communication device have a similar understanding of when it is possible to schedule the communication device.

Some devices may transmit so called keep-alive messages just to avoid loss of the connection to avoid switching between connected and idle state. From a communication device perspective, it is beneficial to be connected continuously since data may be transmitted and received fast when needed (no time is wasted on setting up a connection). Furthermore, the network settings and the traffic generated at the communication device may cause the communication device to always stay connected even if the connection is only needed for short periods at a time. Hence, a C-RNTI may be occupied for long periods of time even if the communication device does not transmit a lot of information.

As the number of connections, due to for example automated communication from communication devices in the radio networks increases, it is possible that the current number of usable RNTI values is not enough to cater for all the devices in the network simultaneously. An example where this may happen is a dense sensor network including a huge amount of temperature/pressure/humidity sensors. In addition, there may be user equipments, such as cellular phones, in the same cell as the sensors. These user equipments may also be connected and, hence, consume (or occupy) a C-RNTI. A solution according to prior art is such that each communication device, i.e. sensor or user equipment, has its own connection to the network. Thus, each communication device requires a C-RNTI that is unique in the cell.

Next, a numerical example of the RNTI limitation is described. Consider X devices, such as weather sensors located in a cell. Each communication device is in RRC CONNECTED state, thereby a unique C-RNTI for each communication device is required. Each communication device sends a measurement report once in every 10 seconds. The size of the measurement report is 1000 bits. Thus, the traffic load generated by each device is:

$r=1000$ bit/10 s=100 bps.

The aggregate traffic generated by X devices is r*X. Assume that the cell throughput of a typical LTE cell is 10 Mbps. From the system capacity point of view, it is possible to have $X=10$ Mbps/100 bps=100 000 devices in a cell.

Therefore, since the RNTI space is limited to 16 bits (which yields 65 536 possible RNTI values), a problem of prior art solutions is that the number of RNTIs does not suffice.

When the RNTI space is exhausted, the network needs to drop connections of some devices to allow for other devices to connect instead. Switching frequently between connected and idle state increases amount of signalling messages, overhead and also battery consumption. For small devices having only very limited battery, this is not desirable.

SUMMARY

An object may be to enable large amounts of communication devices to be connected to a radio network node.

According to an aspect, the object may be achieved by a method in a radio network node for sharing of a first Cell Radio Network Temporary Identifier, referred to as "C-RNTI" between at least a first and a second communication device. A radio communication system comprises the radio network node and the first and second communication devices. The radio network node receives a first random access preamble from the first communication device. Furthermore, the radio network node associates the first C-RNTI to the first communication device, in response to the first random access preamble. The radio network node receives a second random access preamble from the second communication device. Moreover, the radio network node associates the first C-RNTI to the second communication device, in response to the second random access preamble, while the association of the first C-RNTI to the first communication device is maintained. In this manner, the first C-RNTI is shared between said first and second communication devices.

According to another aspect, the object may be achieved by an arrangement in a radio network node for sharing of a first Cell Radio Network Temporary Identifier, referred to as "C-RNTI", between a first and a second communication device. A radio communication system comprises the radio network node and the first and second communication devices. The arrangement may comprise a receiving unit configured to receive a first random access preamble from the first communication device, and a processing circuit configured to associate the first C-RNTI to the first communication device, in response to the first random access preamble. The receiving unit may further be configured to receive a second random access preamble from the second communication device. The processing circuit may further be configured to associate the first C-RNTI to the second communication device, in response to the second random access preamble, while the association of the first C-RNTI to the first communication device is maintained. In this manner, the first C-RNTI is shared between said first and second communication devices.

In some embodiments of the present invention, the C-RNTI is associated to the second UE, while the association of the C-RNTI to the first UE is maintained. In this manner, the C-RNTI is shared between the first and second communication devices. As a result, large amounts of communication devices may be connected to the radio network node. Hence, in order to alleviate the problem of the fact that the number of C-RNTIs may not suffice for predicted future scenarios where huge amounts of communication devices are connected to a radio network node, the present inventors have realized that it may be beneficial to present a solution that allows sharing of at least one C-RNTI between at least two communication devices in a connected state, such as RRC CONNECTED state.

An advantage is that a limited number of C-RNTIs, as defined by current specifications, may be used by a larger number of communication devices as compared to prior art solutions. Hence, without increasing the number of usable C-RNTIs, the present solution enables large amounts of communication devices to be connected to the radio network node.

In some embodiments, the association of the first C-RNTI to the first communication device comprises assigning the first C-RNTI to the first communication device. Furthermore, the association of the first C-RNTI to the second communication device comprises assigning the first C-RNTI to the second communication device, while maintaining the assignment of the first C-RNTI to the first communication device. In some embodiments, the first and second communication devices are connected to the radio network node.

In some embodiments, the first and second communication devices are associated to a first and second long identifier, respectively. The first long identifier is different from the second long identifier. The radio network node receives a third and a fourth random access preamble, indicative of requests for sending data, from the first and second communication devices, respectively. The radio network node sends, to the first and second communication devices, a random access response message in response to the third and fourth random access preambles. The radio network node receives, from the first communication device, a first message including the first long identifier in response to the random access response message. The radio network node receives, from the second communication device, a second message including the second long identifier, in response to the random access response message. The radio network node sends, to the first and second communication devices, a contention resolution message, comprising the first long identifier, thereby allowing the first communication device to send data.

In some embodiments, the following steps may be performed. The radio network node assigns a third and a fourth random access preamble to the first and second communication devices, respectively. The third random access preamble is different from the fourth random access preamble. The radio network node receives the third and fourth random access preambles, indicative of requests for sending data, from the first and second communication devices, respectively. The radio network node sends, to the first communication device, a random access response message including the third random access preamble, in response to the third random access preamble. The radio network node receives, from the first communication device, a first message including the first C-RNTI, in response to the random access response message. The radio network node sends, to the first communication device, a contention resolution message, comprising the first C-RNTI assigned to the first communication device, which enables the first communication device to determine whether it is allowed or not allowed to send data.

In some embodiments, the radio communication system further comprises a third communication device. The radio network node receives a fifth random access preamble from the third communication device. The radio network node assigns a second C-RNTI to the third communication device. The radio network node assigns the third random access preamble to the third communication device. Moreover, the random access response message including the third random access preamble is further sent to the third communication device. The radio network node receives, from the third communication device, a second message including the second C-RNTI, in response to the random access response message. Further, the contention resolution message, comprising the first C-RNTI is sent to the third communication device, thereby disallowing the third communication device to send data.

In some embodiments, the first and second communication devices are associated to a first and second long identifier, respectively. The first long identifier is different from the second long identifier. The radio network node receives a third and fourth random access preamble, indicative of requests for sending data, from the first and second communication devices, respectively. The radio network node sends, to the first and second communication devices, a random access response message in response to the third and fourth random access preambles. The radio network node receives, from the first communication device, a first message including the first long identifier in response to the random access response message. The radio network node receives, from the second communication device, a second message including the second long identifier, in response to the random access response message. The radio network node sends, to the first communication device, a first contention resolution message, comprising the first C-RNTI, which is to be assigned to the first communication device, and the first long identifier, which indicates to the first communication device that it is allowed to send data. The radio network node sends, to the second communication device, a second contention resolution message, comprising the second C-RNTI, which is to be assigned to the second communication device, and the second long identifier, which indicates to the second communication device that it is allowed to send data.

In some embodiments, the first and second communication devices are associated to a first and a second long identifier, respectively. The first long identifier is different from the second long identifier. The radio network node assigns (or associates in some embodiments) a multi-user-C-RNTI (MC-RNTI) to the first and second communication devices. The radio network node selects one of the first and second communication devices, to be allowed to receive data (i.e. to which selected communication device the data is intended). The radio network node sends a downlink message, including the multi-user-C-RNTI and the first long identifier, to the first and second communication devices. The first long identifier enables each of the first and second communication devices, to determine whether the downlink message was intended to it.

In some embodiments, the radio network node configures a timer for the first and second communication devices, respectively, wherein the timer is indicative of when the communication device, is obliged to refrain from using the C-RNTI.

According to yet another aspect, the object may be achieved by a method in a first communication device for enabling sharing of a first Cell Radio Network Temporary Identifier, referred to as "C-RNTI" between at least the first communication device and a second communication device. A radio communication system comprises a radio network node and the first and second communication devices. The first C-RNTI is assigned to the first and second communication devices. The first and second communication devices are associated to a first and second long identifier, respectively. The first long identifier is different from the second long identifier. The first communication device sends a third random access preamble, indicative of a request for sending data, to the radio network node. The first communication device receives, from the radio network node, a random access response message in response to the third random access preambles. The first communication device sends, to the radio network node, a first message including the first long identifier in response to the random access response message. The first communication device receives, from the radio network node, a contention resolution message, comprising the first long identifier. The first communication device checks whether the received long identifier, comprised in the contention resolution message, is equal to the first long identifier assigned to the first communication device.

According to a further aspect, the object may be achieved by an arrangement in a first communication device for enabling sharing of a first Cell Radio Network Temporary Identifier, referred to as "C-RNTI" between at least the first communication device and a second communication device. A radio communication system comprises a radio network node and the first and second communication devices. The first C-RNTI is assigned to the first and second communication devices. The first and second communication devices are associated to a first and second long identifier, respectively. The first long identifier is different from the second long identifier. The arrangement may comprise a sending unit configured to send a third random access preamble, indicative of a request for sending data, to the radio network node. The arrangement further comprises a receiving unit configured to receive, from the radio network node, a random access response message in response to the third random access preamble. The receiving unit may be a receiver. Moreover, the sending unit is further configured to send, to the radio network node, a first message including the first long identifier in response to the random access response message, and the receiving unit is further configured to receive, from the radio network node, a contention resolution message, comprising the first long identifier. Furthermore, the arrangement comprises a processing circuit configured to check whether the received long identifier, comprised in the contention resolution message, is equal to the first long identifier assigned to the first communication device.

In some embodiments, the first communication device sends, to the radio network node, a first message including the first long identifier in response to the random access response message and checks whether the received long identifier, comprised in the contention resolution message, is equal to the first long identifier assigned to the first communication device. In this manner, the first communication device makes it possible for the radio network node to distinguish the first and second communication devices from each other by means of including, for example, the first long identifier (if the first communication device is chosen for transmission) in the contention resolution message. Moreover, the first communication device may be aware of whether it is allowed or not allowed to use the first C-RNTI, since the first communication device may have checked the long identifier comprised in the contention resolution message to determine whether it is allowed or not allowed to send data.

Further features of, and advantages with, embodiments of the present invention will become apparent when studying the appended claims and the following description. Those skilled in the art realize that different features of the embodiments may be combined to create embodiments other than those described in the following, without departing from the scope of the present invention, as defined by the appended claims.

BRIEF DESCRIPTION OF THE DRAWINGS

The various aspects of embodiments of the present invention, including its particular features and advantages, will be readily understood from the following detailed description and the accompanying drawings, in which.

DETAILED DESCRIPTION

Figure 1:
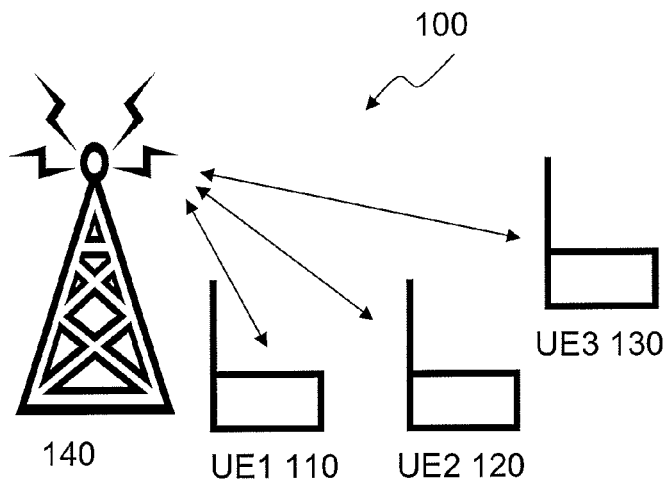
FIG. 1 shows a schematic overview of an exemplifying radio communication system, in which embodiments of the present invention may be implemented.

Throughout the following description similar reference numerals have been used to denote similar nodes, devices, elements, parts, items, steps or features, when applicable. In the Figures, optional steps are indicated by dashed lines where applicable.

In FIG. 1, there is shown a schematic overview of an exemplifying radio communication system 100, in which embodiments of the present invention may be implemented. The radio communication system 100 may be a radio communication system, such as an LTE system, a HSPA system, WiMAX system or the like. In some cases, the radio communication system 100 may be based on Orthogonal Frequency Division Multiplexing (OFDM). The radio communication system 100 comprises a first, second and third communication device 110, 120, 130 (or a UE1, UE2 and UE3 as shown in FIG. 1) and a radio network node 140, such as an eNB in case of an LTE system. In some embodiments, the first, second and third communication devices 110, 120, 130 may each comprise a sensor unit, comprising a transceiver (not shown in FIG. 1) adapted for radio communication with the radio network node 140. In cases, when the first, second and third communication devices 110, 120, 130 each comprises a machine-type-device, such as a laptop, a digital camera, a car, an outdoor thermometer, an indoor thermometer, an electricity meter or other device which may communicate (or be operated autonomously) without input from a user, the solutions presented herein may be particularly preferred. The arrows between the radio network node 140 and the first, second and third communication devices, respectively, denote that a connection, such as an RRC connection, may be established between the respective communication device and the radio network node 140.

As used herein, the term "communication device" has been used to denote any device capable of communicating with the radio communication system.

As used herein the term "machine-type-device" has been used to denote a subset of communication devices of all types. A machine-type-device is characterized by that it may automatically communicate with a radio communication system without any need for user interaction. As an example, a machine-type-device may be a temperature sensor which may send information about the temperature at the location of the temperature sensor to the radio communication system. Notably, the present solution is also applicable to communication devices that are not machine-type-devices.

As used herein the term "user equipment" has been used to denote a subset of communication devices of all types. A user equipment may, as an example, denote any communication device which comprises a display for interaction with a user.

As used herein the term "associate" has been used to (1) denote that, for example, the radio network node internally keeps track of, for example, a C-RNTI and an associated communication device or (2) to denote that the radio network node sends a message to the communication device, which sets its context according to the message. This latter meaning (2) is also referred to by the term "assigning". Hence, the term "associate" is broader than the term "assign". When a C-RNTI has been assigned to a communication device, the context of the communication device is affected, whereas when a C-RNTI has been associated to a communication device, the context of the communication device must not be affected, but may be affected in some cases.

Figure 2:
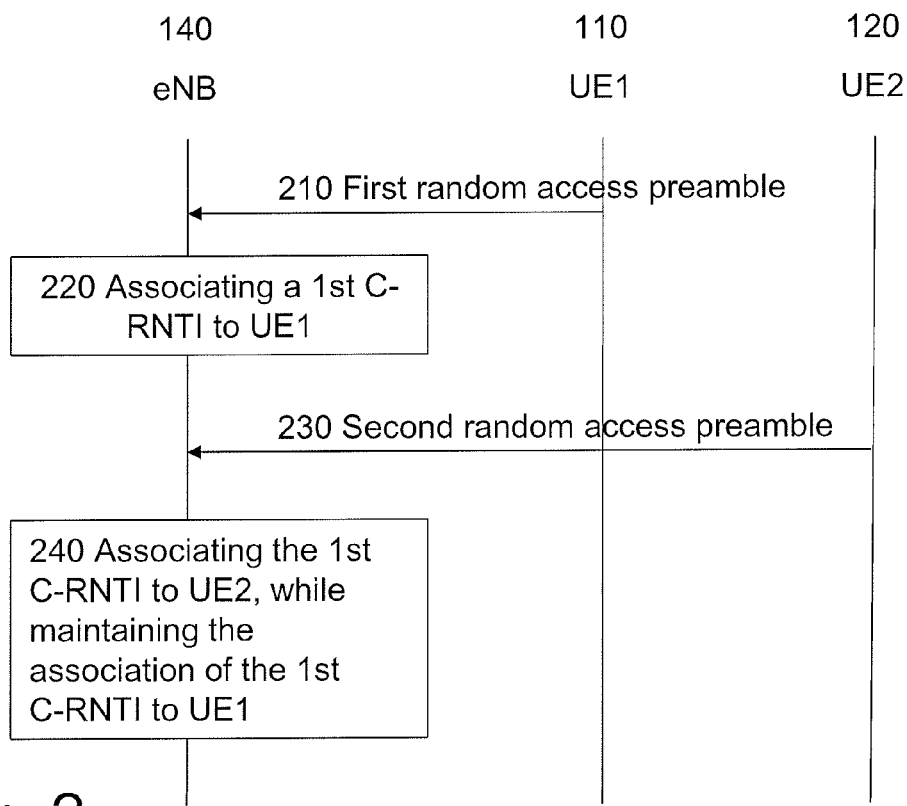
FIG. 2 shows a schematic, combined signalling and flow chart of an embodiment of a method in the radio communication system according to FIG. 1 for sharing of a C-RNTI between at least a first and a second communication device.

In FIG. 2, there is shown a schematic, combined signalling and flow chart of an embodiment of the method in the radio communication system according to FIG. 1 for sharing of a C-RNTI between at least a first and a second communication device 110, 120 (UE1, UE2). A radio communication system 100 comprises the radio network node 140 and the first and second communication devices 110, 120. The following steps may be performed. Notably, in some embodiments of the method the order of the steps may differ from what is indicated below.

210 The radio network node 140 receives a first random access preamble from the first communication device 110. More specifically, the first random access preamble may be sent on RACH.

220 The radio network node 140 associates the first C-RNTI to the first communication device 110, in response to the first random access preamble.

230 The radio network node 140 receives a second random access preamble from the second communication device 120. More specifically, the second random access preamble may be sent on RACH.

240 The radio network node 140 associates the first C-RNTI to the second communication device 120, in response to the second random access preamble, while the association of the first C-RNTI to the first communication device 110 is maintained. Thus, the first C-RNTI is shared between said first and second communication devices 110, 120. As a result, the first and second communication device 110, 120 may be connected to the radio network node 140, i.e. the first and second communication devices 110, 120 may be in RRC CONNECTED state without necessarily being assigned a respective C-RNTI as in prior art solutions.

In scenarios where tremendous amounts of communication devices are expected, it is herein presented a solution in which the C-RNTIs are allowed to be shared between several communication devices. In this manner, the radio network node 140 may allow a larger number of communication devices to be connected to it without increasing the number of C-RNTIs. In existing solutions, it is only allowed to assign one C-RNTI to one communication device in one cell, i.e. in a one-to-one relationship. Disadvantages with increasing the number of useable C-RNTIs are for example:

increased overhead in scenarios where there are comparably few connections, increased overhead may lead to decreased capacity for data, and if the RNTI length is be changed, the total structure of PDCCH carrying RNTIs needs to be changed as well.

Since sharing of a C-RNTI, as introduced by embodiments of the present invention, is allowed, problems occur in distinguishing one communication device from another, when, for example, two or more communication devices send scheduling requests (random access preambles) simultaneously, and when the radio network node wishes to send data to the communication device. These and other problems are solved by the embodiments presented in FIGS. 3 to 7.

Figure 3:
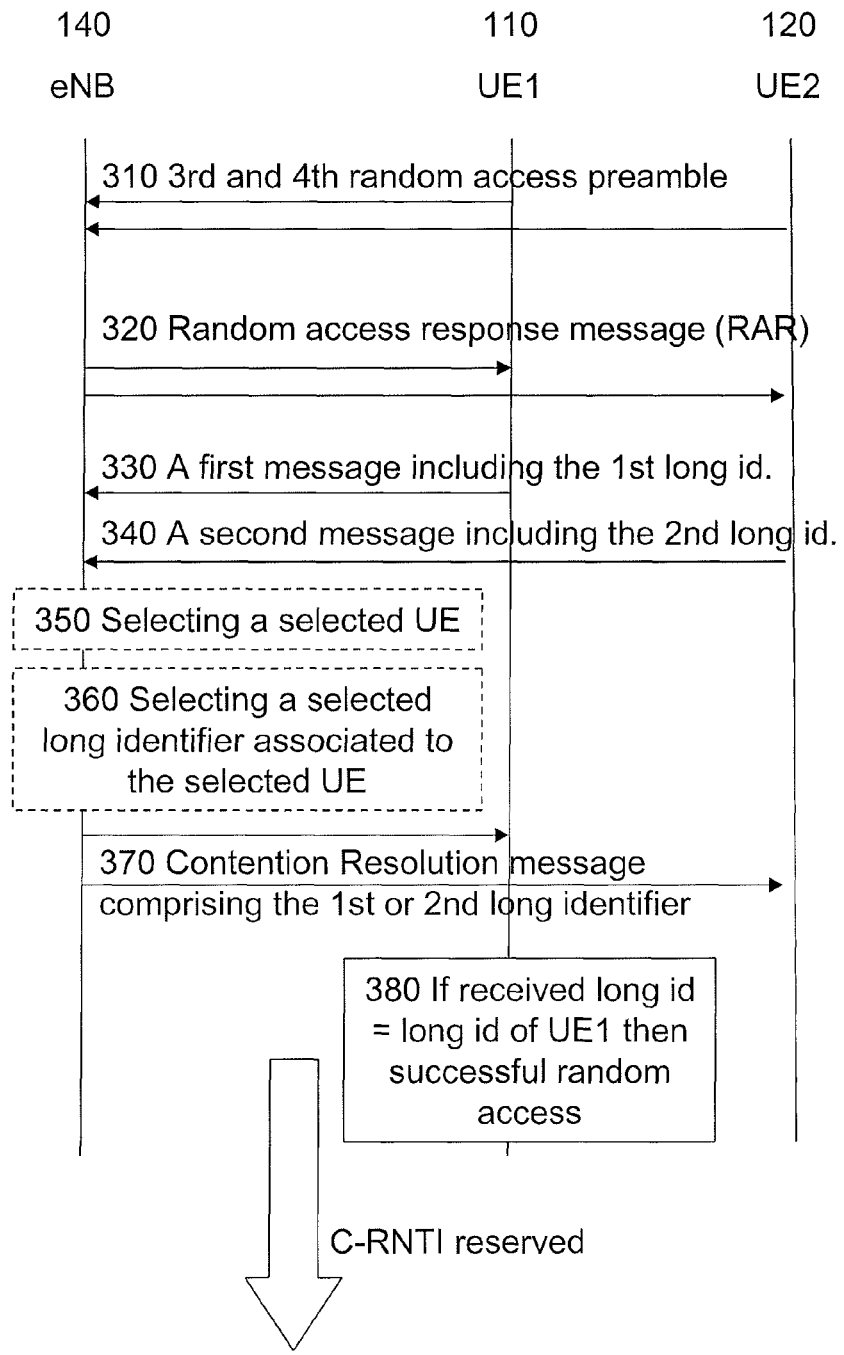
FIG. 3 shows a schematic, combined signalling and flow chart of another embodiment of the method in the radio communication system according to FIG. 1.
Figure 4:
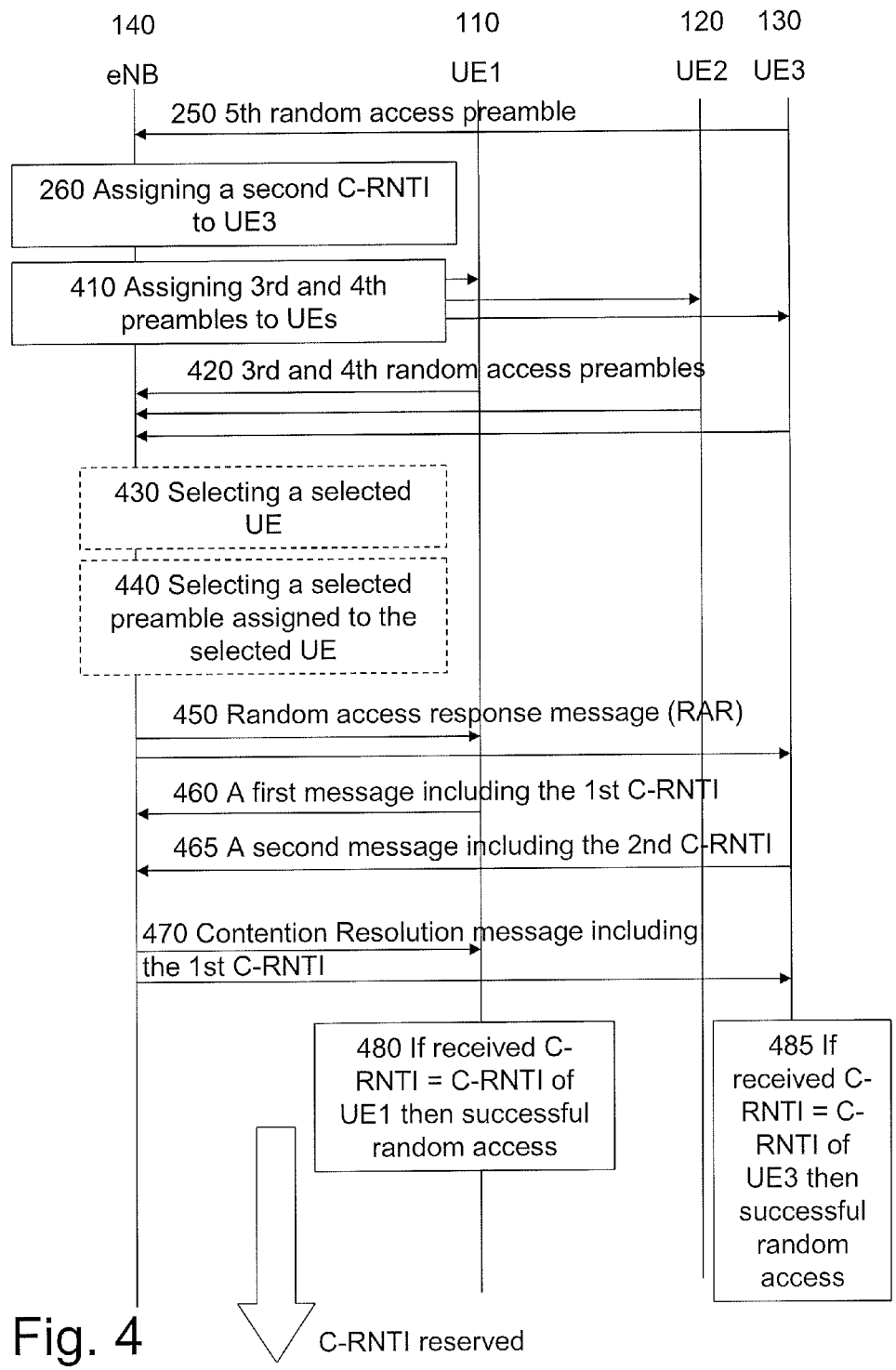
FIG. 4 shows a schematic, combined signalling and flow chart of another embodiment of the method in the radio communication system according to FIG. 1.

In some embodiments of the method in the radio network node 140, which applies to the embodiments shown in FIGS. 3 and 4, the association 220 of the first C-RNTI to the first communication device 110 comprises assigning the first C-RNTI to the first communication device 110. Furthermore, the association 240 of the first C-RNTI to the second communication device 120 comprises assigning the first C-RNTI to the second communication device 120, while maintaining the assignment of the first C-RNTI to the first communication device 110. In some embodiments, the first and second communication devices 110, 120 are connected to the radio network node 140. Expressed differently, the radio network node 140 assigns the first C-RNTI to both the first and second communication devices 110, 120, when the first and second communication devices 110, 120 are connected to the radio network node 140. When the first and second communication device 110, 120 are connected to the radio network node 140, they may have entered, for example, RRC CONNECTED state (as known from 3GPP-terminology). It shall, hence, be noted that this embodiment allows the first C-RNTI to be assigned to the first and second communication devices simultaneously.

Now referring to FIG. 3, in some embodiments of the method in the radio network node 140, the first and second communication devices 110, 120 are associated to a first and second long identifier, respectively. The first long identifier is different from the second long identifier. More specifically, the first and second long identifiers may be temporary mobile subscriber identities (TMSI) or international mobile subscriber identities (IMSI) of the first and/or second communication devices. In this manner, higher layer identifiers are used by the radio network node 140 to distinguish the first communication device 110 from the second communication device 120. The following steps may be performed. Notably, in some embodiments of the method the order of the steps may differ from what is indicated below.

310 The radio network node 140 receives a third and a fourth random access preamble, indicative of requests for sending data, from the first and second communication devices 110, 120, respectively. As an example, the third and fourth random access preambles may be sent by the first and second communication devices in conjunction with a Scheduling Request (SR) on RACH or PUCCH (Physical Uplink Control Channel).

320 The radio network node 140 sends, to the first and second communication devices 110, 120, a random access response message in response to the third and fourth random access preambles. More specifically, the random access response message may include a scheduling grant for an uplink transmission from the first and second communication device 110, 120. Since both the first and second communication device may not transmit according to the scheduling grant, this conflict needs to be resolved as described in the following steps.

330 The radio network node 140 receives, from the first communication device 110, a first message including the first long identifier (1st long id.) in response to the random access response message. More specifically, the first message may be a message 3 (as known from 3GPP-terminology) albeit somewhat modified in that the first message comprises a long identifier, e.g. the first long identifier, which is not present in a message 3 according to 3GPP-terminology, when the first and/or second communication device is in connected state, such as RRC CONNECTED state.

340 The radio network node 140 receives, from the second communication device 120, a second message including the second long identifier (2nd long id.), in response to the random access response message. More specifically, the second message may be another message 3 albeit somewhat modified.

370 The radio network node 140 sends, to the first and second communication devices 110, 120, a contention resolution message, comprising the first long identifier, thereby allowing the first communication device 110 to send data. The first communication device 110 is allowed to send data because the first long identifier, transmitted by the first communication device 110 to the radio network earlier, is comprised in the contention resolution message. Thereby, the radio network node 140 has resolved the conflict by allowing only one of the first and second communication devices 110, 120 to send (or receive) data. It may be noted that it is the content of the contention resolution message (i.e. the first long identifier comprised in the contention resolution message) that allows each of the first and second communication devices 110, 120 to determine whether or not it is allowed to send and receive data. Expressed differently, in the step 370, the first communication device 110 receives the contention resolution message comprising the first long identifier.

380 This step is not comprised in the method performed by the radio network node 140. The first communication device 110 checks whether the received long identifier, comprised in the contention resolution message, is equal to the long identifier of the first communication device 110. In that case, the first communication device 110 may use the first C-RNTI and may consequently send data. It may be noted that the first C-RNTI is reserved for use by the first communication device 110 from this point onward.

The second communication device 120 may also receive the contention resolution message as shown in FIG. 3 by an arrow in conjunction with step 370. Then, the second communication device 120 may check (not shown in FIG. 3) whether the received long identifier, comprised in the contention resolution message, is equal to the long identifier of the second communication device 120. The first long identifier, i.e. the received long identifier, is, in this case, not equal to the second long identifier of the second communication device 120 and the second communication device 120 may not use the first C-RNTI. Hence, the second communication device 120 may not send data. Furthermore, the first communication device 110 may, after the step of 380, follow any assignments or commands issued with the first C-RNTI. Any other communication device, such as the second communication device 120, sharing the first C-RNTI with the first communication device 110, may not obey or listen to any assignments or commands issued with the first C-RNTI. In this case, the second communication device 120 is aware of that it may not obey or listen to any assignments or commands issued with the first C-RNTI, because the contention resolution message does not comprise the second long identifier associated to the second communication device 120.

Again with reference to FIG. 3, in some embodiments of the method in the radio network node 140, the following steps may be performed. Notably, in some embodiments of the method the order of the steps may differ from what is indicated below.

350 Optionally, the radio network node 140 selects at least one of the first and second communication devices 110, 120 to be allowed to send data. Hence, a selected communication device may be allowed to send data.

360 Optionally, the radio network node 140 selects the first or second long identifier based on the first or second communication device 110, 120 according to selection in step 350. Hence, a selected long identifier is based on the selected communication device.

When steps 350 and 360 have been performed, the contention resolution message of the step 380 comprises the selected long identifier, i.e. the first or second long identifier.

In some embodiments, before the sending of the contention resolution message, the contention resolution message is generated based on which of the first and second communication device shall be allowed to send data. E.g. the first long identifier is comprised in the contention resolution message when it is desired that the first communication device 110 shall be allowed to send data and the second long identifier is comprised in the contention resolution message when it is desired that the second communication device 120 shall be allowed to send data. When generating the contention resolution message different considerations may be taken into account. For example, the communication device to be allowed to send data may be set arbitrarily, be selected based on type of data that the communication device intends to send (as an example, voice data may have higher priority than infrequency reported measurement data), or be selected based on the type of the communication device, such as machine-type-device or user equipment.

With reference to FIG. 4, in a further embodiment of the method in the radio network node 140, the following steps may be performed. Here the steps related to the first and second communication devices 110, 120 are described. The steps related to a third communication device 130, shown in FIG. 4, are described in the next paragraph. Notably, in some embodiments of the method the order of the steps may differ from what is indicated below.

410 The radio network node 140 assigns a third and a fourth random access preamble to the first and second communication devices 110, 120, respectively. The third random access preamble is different from the fourth random access preamble. By means of the third and fourth random access preambles, the radio network node 140 may now designate a message to the first communication device 110 or the second communication device 120. In some embodiments, the third random access preamble may be assigned to a group of communication devices. Different C-RNTIs are assigned to each of the communication devices in the group.

420 The radio network node 140 receives the third and fourth random access preambles, indicative of requests for sending data, from the first and second communication devices 110, 120, respectively. As an example, the third and fourth random access preambles may be sent by the first and second communication devices in conjunction with a Scheduling Request (SR) on RACH or PUCCH (Physical Uplink Control Channel).

450 The radio network node 140 sends, to the first communication device 110, a random access response message including the third random access preamble, in response to the third random access preamble. The second communication device 120 is assigned to the fourth random access preamble and is hence not, figuratively speaking, receiving the random access response message.

460 The radio network node 140 receives, from the first communication device 110, a first message including the first C-RNTI, in response to the random access response message. More specifically, the first message may be a first message 3.

470 The radio network node 140 sends, to the first communication device 110, a contention resolution message, comprising the first C-RNTI assigned to the first communication device 110, which enables the first communication device 110 to determine whether it is allowed or not allowed to send data.

480 The first communication device 110 has received the contention resolution message comprising the first C-RNTI. The first communication device 110 checks whether the first C-RNTI is assigned to the first communication device 110. If the first C-RNTI is assigned to the first communication device 110, the first communication device 110 may use the first C-RNTI. In this example, the first communication device 110 may send data (random access was successful). The first C-RNTI is reserved for use by the first communication device 110 from this point onward.

Furthermore, also with reference to FIG. 4, in some embodiments of the method in the radio network node 140, the radio communication system 100 further comprises a third communication device 130. The following steps, relating to the third communication device 130, may be performed. Notably, in some embodiments of the method the order of the steps may differ from what is indicated below.

250 The radio network node 140 receives a fifth random access preamble from the third communication device 130. More specifically, the firth random access preamble may be received on RACH.

260 The radio network node 140 assigns a second C-RNTI to the third communication device 130.

410 The radio network node 140 assigns the third random access preamble to the third communication device 130. Thus, the third random access preamble is assigned to the first and third communication devices 110, 130.

Moreover, the random access response message including the third random access preamble further sent to the third communication device 130, i.e. the random access response message of step 450 above is also received by the third communication device 130. The random access response message may be received by the third communication device because the third random access preamble is assigned to the third communication device 130.

465 The radio network node 140 receives, from the third communication device 130, a second message including the second C-RNTI, in response to the random access response message. More specifically, the second message may be a second message 3.

Further, the contention resolution message, comprising the first C-RNTI is sent to the third communication device 130, thereby disallowing the third communication device 130 to send data. That is to say, the contention resolution message of step 470 above is also received by the third communication device 130. The third communication device 130 will not be allowed to send data, since the second C-RNTI, not the first C-RNTI, has been assigned to the third communication device. Again, but expressed differently, in conjunction with step 485 below.

485 The third communication device 130 receives the contention resolution message comprising the first C-RNTI. The third communication device 130 checks whether the first C-RNTI is assigned to the third communication device 130. In this example, the first C-RNTI has not been assigned to the third communication device 130, but instead the second C-RNTI has been assigned to the third communication device 130. Hence, the third communication device 130 may not send data.

In some embodiments of the method in the radio network node 140, the optional steps indicated in FIG. 4 may be performed. Notably, in some embodiments of the method the order of the steps may differ from what is indicated below.

430 Optionally, the radio network node 140 selects one of the first and second communication devices 110, 120 to be allowed to send data. Thus, a selected communication device may be allowed to send data.

440 Optionally, the radio network node 140 selects the third or fourth random access preamble based on the first or second communication device 110, 120 according to selection in step 430. A selected random access preamble may be one of the third and fourth random access preambles. Here, the third random access preamble may be the selected random access preamble in order to match the random access preamble assigned to the first communication device 110.

Figure 5:
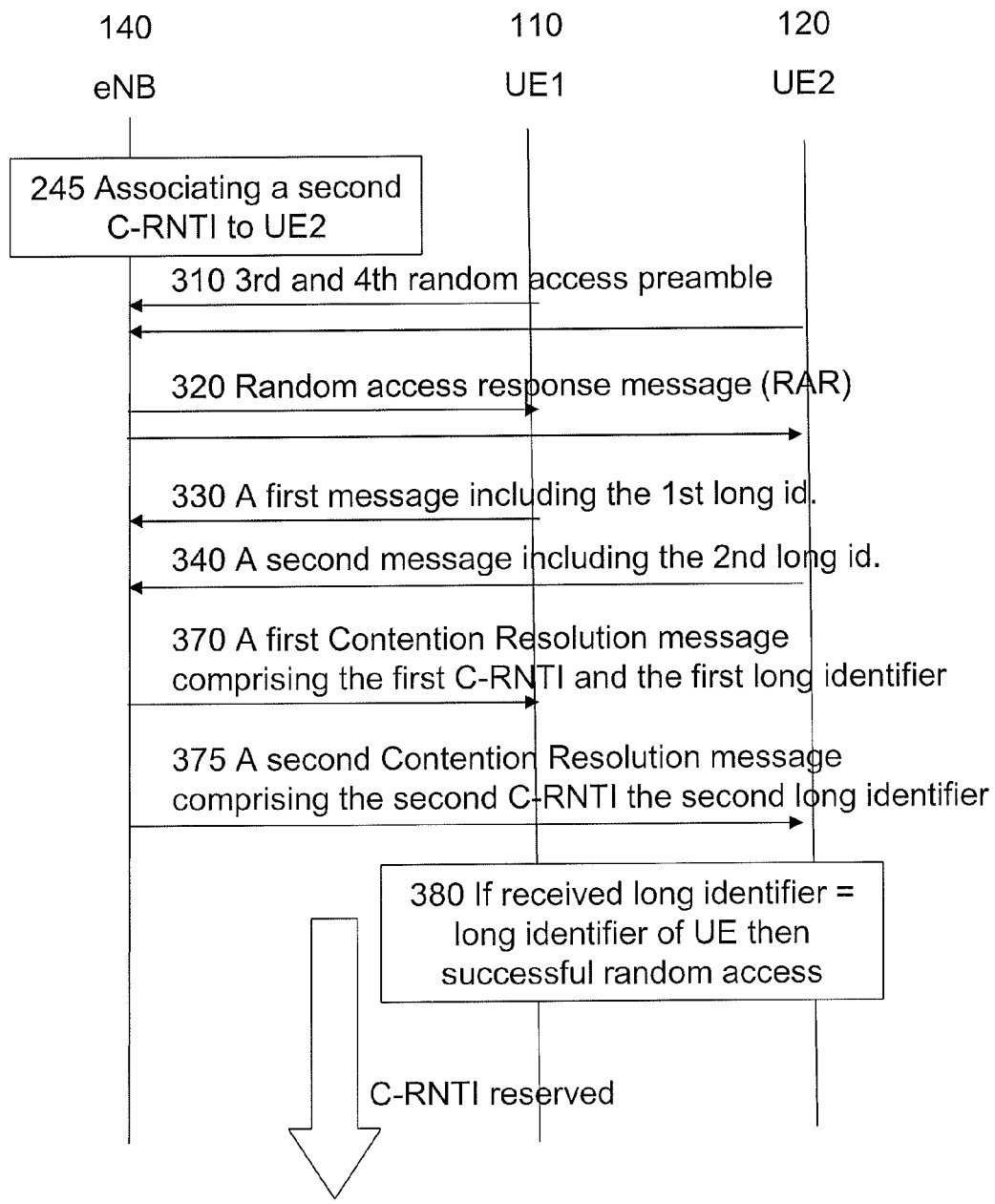
FIG. 5 shows a schematic, combined signalling and flow chart of another embodiment of the method in the radio communication system according to FIG. 1.

In FIG. 5, there is illustrated another embodiment of the method in the radio network node 140, in which a pool of C-RNTIs is associated to the second communication device 120. It may be noted that, even though the second communication device 120 may be in RRC CONNECTED state, a C-RNTI has not been assigned to the second communication device 120. Instead, the pool of C-RNTIs is associated to the second communication device 120. Thanks to the pool of C-RNTIs, being associated to the second communication device 120, it is be possible to select a C-RNTI to be used by the second communication device 120, which selected C-RNTI is not used by the first communication device 110. Thereby, it is possible for both the first and second communication device 110, 120 to send data, even though there initially appeared to be a conflict.

In some embodiments of the method in the radio network node 140, as shown in FIG. 5, the following step may be performed.

245 The radio network node 140 associates a second C-RNTI to the second communication device 120, whereby a group of C-RNTIs, comprising the first and second C-RNTIs, are associated to the second communication device 120.

In some embodiments of the method in the radio network node 140, also illustrated in FIG. 5, the first and second communication devices 110, 120 are associated to a first and second long identifier, respectively. The first long identifier is different from the second long identifier. The following steps may be performed. Notably, in some embodiments of the method the order of the steps may differ from what is indicated below.

310 The radio network node 140 receives a third and fourth random access preamble, indicative of requests for sending data, from the first and second communication devices 110, 120, respectively.

320 The radio network node 140 sends, to the first and second communication devices 110, 120, a random access response message in response to the third and fourth random access preambles. More specifically, the random access response message may include a scheduling grant for an uplink transmission from the first and second communication device 110, 120. Thanks to the pool of C-RNTIs associated to the second communication device 120, it shall be seen from the following steps that both the first and second communication devices 110, 120 may transmit while listening to commands or assignments issued with the first and second C-RNTI, respectively.

330 The radio network node 140 receives, from the first communication device 110, a first message including the first long identifier (1st long id.) in response to the random access response message. More specifically, the first message may be a first message 3, albeit somewhat modified.

340 The radio network node 140 receives, from the second communication device 120, a second message including the second long identifier (2nd long id.), in response to the random access response message. More specifically, the second message may be a second message 3 albeit somewhat modified.

370 The radio network node 140 sends, to the first communication device 110, a first contention resolution message, comprising the first C-RNTI, which is to be assigned to the first communication device 110, and the first long identifier, which indicates to the first communication device 110 that it is allowed to send data. Expressed differently, the first communication device 110 receives the first contention resolution message, comprising the first long identifier. The first long identifier is indicative of whether the first communication device 110 is allowed or not allowed to send (and receive) data.

375 The radio network node 140 sends, to the second communication device 120, a second contention resolution message, comprising the second C-RNTI, which is to be assigned to the second communication device 120, and the second long identifier, which indicates to the second communication device 120 that it is allowed to send data. Expressed differently, the second communication device 120 receives the second contention resolution message, comprising the second long identifier.

When the radio network node 140 creates the first and second contention resolution messages above, the radio network node 140 needs to ensure that the C-RNTIs of the first and second contention resolution messages are different (as exemplified above).

380 When checking whether the long identifier comprised in the received contention resolution message is equal to the long identifier of the first communication device 110, the first communication device 110 will find that those long identifiers are equal. Hence, the first communication device 110 may use the first C-RNTI and send data. In this example, the second communication device 120 will find that the received long identifier, comprised in the second contention resolution message, is equal to the second long identifier of to the second communication device 120. Thus, the second communication device 120 may send data, using the second C-RNTI comprised in the second contention resolution message. Thus, the first C-RNTI is reserved for use by the first communication device 110 and the second C-RNTI is reserved for use by the second communication device 120 from this point onward.

As a result, both the first and second communication devices 110, 120 may send data using different C-RNTIs, i.e. the first and second C-RNTI, which from this point onward are reserved for use by the first and second communication devices 110, 120, respectively.

Another problem occurs in scenarios where the first and second communication devices 110, 120 may receive data in the downlink prior to sending data in the uplink. Normally, such communication device may be reached by forcing the device to resynchronize with the radio network node 140 through a PDCCH order to the C-RNTI of the communication device. With the present solution, further steps need to be taken in order to distinguish multiple communication devices, such as the first and second communication devices, being assigned or associated to the same C-RNTI, such as the first C-RNTI.

Figure 6:
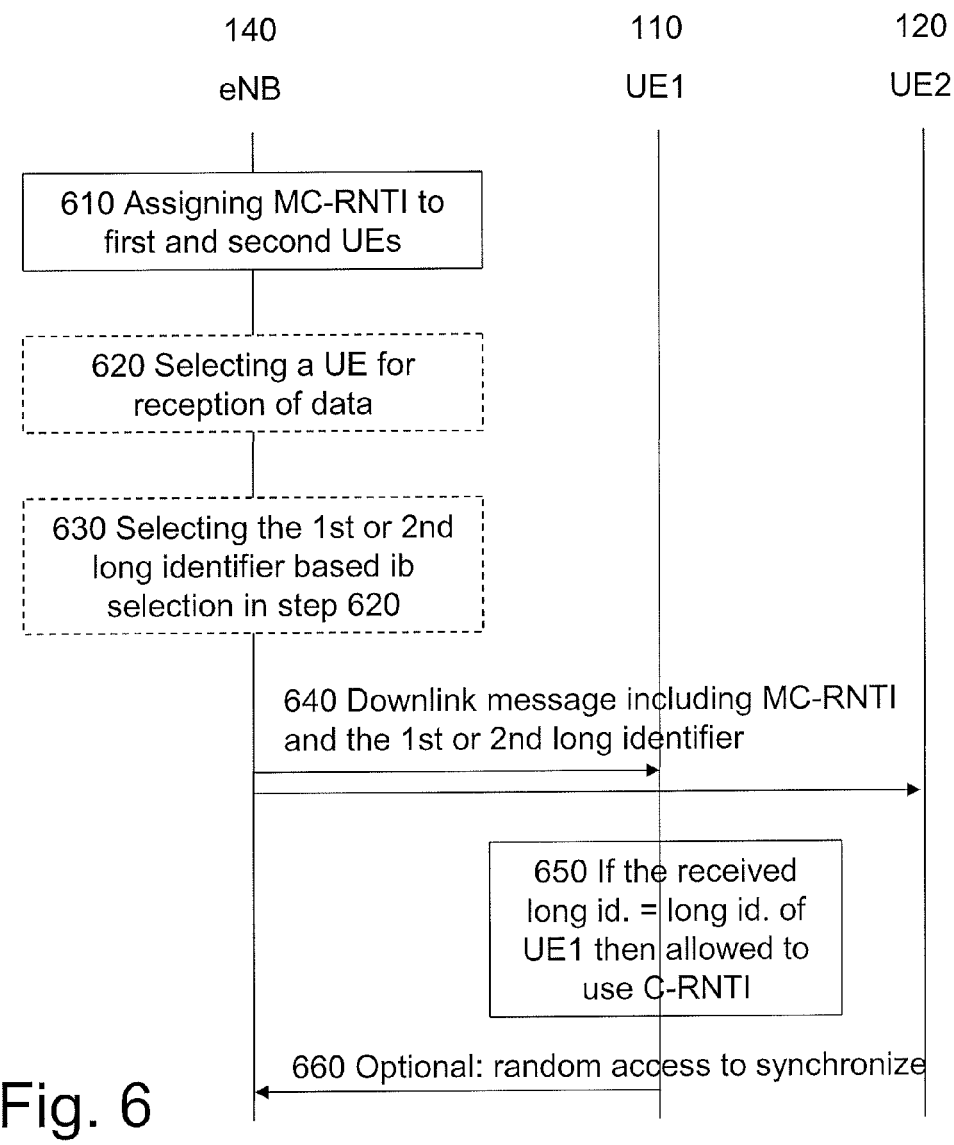
FIG. 6 shows a schematic, combined signalling and flow chart of another embodiment of the method in the radio communication system according to FIG. 1.

Now referring to FIG. 6, there is illustrated a scenario in which the radio network node 140 initiates communication with the communication devices 110, 120. The first and second communication devices 110, 120 are associated to a first and a second long identifier, respectively. The first long identifier is different from the second long identifier. More specifically, the first and second long identifiers may be temporary mobile subscriber identities (TMSI) or international mobile subscriber identities (IMSI) of the first and/or second communication devices. In this manner, higher layer identifiers are used by the radio network node 140 to distinguish the first communication device 110 from the second communication device 120. The following steps may be performed. Notably, in some embodiments of the method the order of the steps may differ from what is indicated below.

610 The radio network node 140 assigns (or associates in some embodiments) a multi-user-C-RNTI (MC-RNTI) to the first and second communication devices 110, 120. For example, all communication devices assigned with the C-RNTI values "45" and "78" listen to the MC-RNTI value "4", and all communication devices sharing the C-RNTI value "678" listen to commands assigned using the MC-RNTI value "5". Thus, the MC-RNTI operates as a "paging" RNTI, where multiple communication devices are reached with the same identity, but where only the message content reveals who the message is intended for. One specific embodiment is thus to use the P-RNTI (i.e. MC-RNTI is "replaced" by the existing P-RNTI) and the paging channel (PCH) to reach UEs in RRC CONNECTED, when such communication devices share identities.

620 The radio network node 140 selects one of the first and second communication devices 110, 120 to be allowed to receive data (i.e. to which selected communication device the data is intended).

630 Optionally, the radio network node 140 selects the first or second long identifier based on the selection of the first or second communication device in step 620.

640 The radio network node 140 sends a downlink message, including the multi-user-C-RNTI and the first long identifier, to the first and second communication devices 110, 120. The first long identifier enables each of the first and second communication devices 110, 120 to determine whether the downlink message was intended to it.

650 The first communication device 110 checks whether the first long identifier, comprised in the downlink message, is equal to the first long identifier associated to the first communication device 110. Thus, the first communication device 110 may conclude that the downlink message was intended to it.

660 Optionally, the first communication device 110 may need to synchronize in case synchronization has been lost.

In some embodiments of the method in the radio network node 140, the multi-user-C-RNTI comprises paging radio network temporary identifier, referred to as P-RNTI.

The C-RNTI is reserved, as explained in the embodiments above, for a particular communication device only over a limited time period. The reservation may be released when e.g. one of the following events occur:

1. A C-RNTI release command received by the communication device. The command is sent by the radio network node and may be, e.g., a RRC command or a MAC Control element.
2. A C-RNTI reservation timer expires. The specific C-RNTI timer is defined for communication devices sharing C-RNTIs. The timer is initially started when the C-RNTI contention is solved as described above and may be restarted when a scheduling assignment is received. The timer length is configured by the network.
3. The Timing Alignment timer expires.
4. The communication device is not active anymore as regard to DRX operation (see below). This may happen when the DRX On Duration timer, DRX Inactivity timer, or DRX Retransmission timer expires.

When the C-RNTI reservation ends, the communication device will not listen to the PDCCH anymore until it again wants to transmit something.

Figure 7:
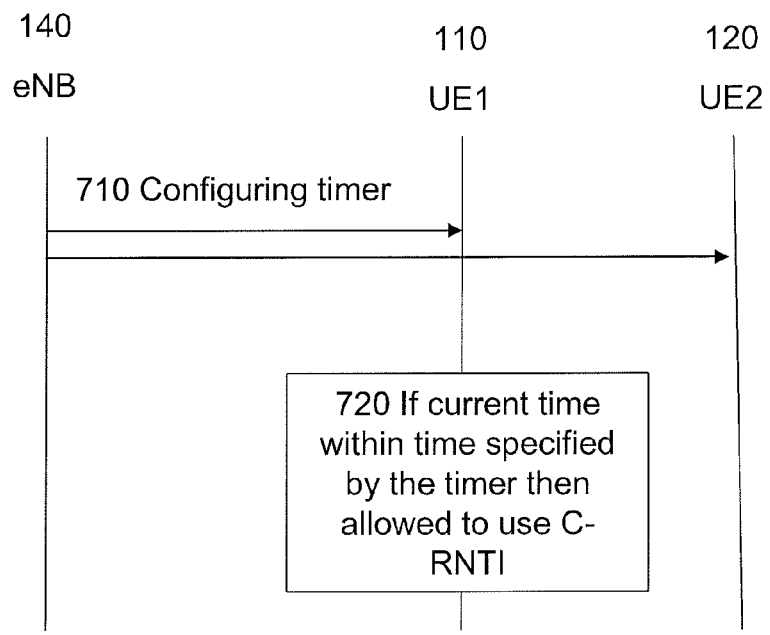
FIG. 7 shows a schematic, combined signalling and flow chart of another embodiment of the method in the radio communication system according to FIG. 1.

FIG. 7 shows a combined, signalling and flow chart of another embodiment of a method in the radio network node 140, in which method the concept of DRX is extended. The following step may be performed.

710 The radio network node 140 configures a timer for the first and second communication devices 110, 120, respectively, wherein the timer is indicative of when the communication device 110, 120 is obliged to refrain from using the C-RNTI. See further description of the timer below.

720 The first communication device 110 determines whether current time is within time period indicated by the timer. When current time is within time period indicated by the timer, the first communication device 110 is allowed to use the first C-RNTI.

In this embodiment, the first and second communication devices 110, 120 are allowed to use the first C-RNTI only in certain time periods as given by the timer. Outside of those times, the communication devices 110, 120 are not allowed to use the first C-RNTI (i.e. the shared C-RNTI). Allocation of time periods can be done in multiple ways. One solution is to exploit the current DRX procedure specified in LTE with modifications. Another solution is to introduce new timers or rules for C-RNTI sharing.

There can be several time scales to do the time based C-RNTI control as indicated by the timer. For example, the first communication device 110 may be allocated to use the first C-RNTI during daytime, e.g., from 8:00 to 20:00 and the second communication device 120 could be allocated to use the same C-RNTI during night-time, e.g., from 20:00 to 8:00. This way the communication device (out of the first and second communication devices), using the first C-RNTI, is always uniquely known and no additional signalling (as in the embodiments above) to confirm the identity of the communication device (by means of for example IMSI) is needed. If desired, a guard period may be added to the switching times. The guard period may be, for example, 1 minute when neither of the first and second communication devices 110, 120 may be allowed to use the first C-RNTI. Another example could be to allow the first communication device 110 to use the first C-RNTI for 1000 ms at a time and the next 1000 ms are then allocated for use by the second communication device 120.

Alternatively, the periods during which the first and second communication devices 110, 120 are allowed to use the first C-RNTI is defined based on a modulo operation on the System Frame Number (SFN), where the SFN is a cyclic time-counter that is incremented by one e.g. every 10th millisecond. For example, the first communication device 110 may be configured to start using the first C-RNTI when the following equation is satisfied:

SFN modulo first C-RNTI-cycle=first C-RNTI-offset, where the first C-RNTI-cycle and first C-RNTI-offset may be configurable parameters.

In addition, a configurable parameter C-RNTI-duration may be defined, that describes how many frames or subframes the first and second communication devices 110, 120 are allowed to use the aforementioned first C-RNTI. This parameter defines the first and second communication devices 110, 120 to continue using the first C-RNTI for a pre-determined number of subframes after each event when the equation above is satisfied. By configuring multiple communication devices that share the same identity, it is thus possible to assure that two communication devices never use the shared C-RNTI at the same time.

For example, if the first communication device 110 has the first C-RNTI-cycle set to 512 and the first C-RNTI-offset set to 0, and the second communication device has C-RNTI-cycle set to 512 and C-RNTI-offset set to 256, and both the first and second communication devices 110, 120 are configured to use the shared first C-RNTI maximally 256 frames after the satisfaction of the equation above, then it is ensured that the first and second communication devices 110, 120 never use the shared first C-RNTI at the same time. Specifically, the first communication device 110 will use the first C-RNTI during times when SFN is within the intervals {0,255}, {512, 767}, . . . while the second communication device 120 will use the first C-RNTI during times when SFN {256, 511}, {768, 1023}, . . . .

In the example above, the SFN is used as the reference for dividing the use of the first C-RNTI over time. It should be understood that the solution may be applied on any other time-granularity, such as the sub-frame number, where each radio frame (SFN) is further divided into subframes of 1 ms duration.

Here the standardized DRX mechanism is utilized in C-RNTI sharing. It then needs to be further defined that when the first communication device 110 is not active, the first C-RNTI, signalled on PDCCH, is not valid for the first communication device 110, i.e., the DRX is mandatory instead of optional. In addition, transmission of the SR over RACH or PUCCH may be restricted to certain periods or times. This period may be active time as defined in DRX, or the On Duration time, which occurs in the beginning of each DRX cycle.

Figure 8:
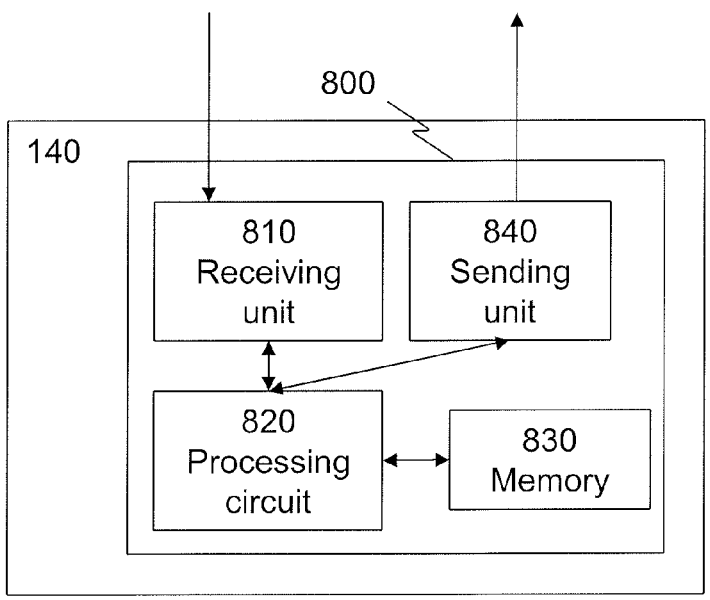
FIG. 8 shows a schematic block diagram of an arrangement in the radio network node according to an embodiment of the present invention.

Turning to FIG. 8, there is shown an arrangement 800 in the radio network node 140 for sharing of a first Cell Radio Network Temporary Identifier, referred to as "C-RNTI" between a first and a second communication device 110, 120. The radio network node 140 may comprise the arrangement 800. A radio communication system 100 comprises the radio network node 140 and the first and second communication devices 110, 120. The arrangement 800 may comprise a receiving unit 810 configured to receive a first random access preamble from the first communication device 110, and a processing circuit 820 configured to associate the first C-RNTI to the first communication device 110, in response to the first random access preamble. The receiving unit 810 may further be configured to receive a second random access preamble from the second communication device 120. The processing circuit 820 may further be configured to associate the first C-RNTI to the second communication device 120, in response to the second random access preamble, while the association of the first C-RNTI to the first communication device 110 is maintained. Thus, the first C-RNTI is shared between said first and second communication devices 110, 120. The processing circuit 820 may be realized by a processing unit, a processor, an application specific integrated circuit (ASIC), a field-programmable gate array (FPGA) or the like. Moreover, the arrangement 800 may comprise a memory 830 connected to the processing circuit 820. The memory 830 may store instructions for performing embodiments disclosed herein, which instructions may be executed by the processing circuit 820.

In some embodiments of the arrangement 800 in the radio network node 140, the arrangement 800 further is configured to assign the first C-RNTI to the first communication device 110 and to assign the first C-RNTI to the second communication device 120, while the assignment of the first C-RNTI to the first communication device 110 is maintained. The first and second communication devices 110, 120 are connected to the radio network node 140.

In some embodiments of the arrangement 800 in the radio network node 140, the first and second communication devices 110, 120 are associated to a first and second long identifier, respectively. The first long identifier is different from the second long identifier. The arrangement 800 is further configured to receive a third and a fourth random access preamble, indicative of requests for sending data, from the first and second communication devices 110, 120, respectively. The arrangement 800 is further configured to send, to the first and second communication devices 110, 120, a random access response message in response to the third and fourth random access preambles. The arrangement 800 is further configured to receive, from the first communication device 110, a first message including the first long identifier (1st long id.) in response to the random access response message. The arrangement 800 is further configured to receive, from the second communication device 120, a second message including the second long identifier (2nd long id.), in response to the random access response message. The arrangement 800 is further configured to send, to the first and second communication devices 110, 120, a contention resolution message, comprising the first long identifier, thereby allowing the first communication device 110 to send data.

In some embodiments of the arrangement 800 in the radio network node 140, the arrangement 800 further is configured to assign a third and a fourth random access preamble to the first and second communication devices 110, 120, respectively. The third random access preamble is different from the fourth random access preamble. The arrangement 800 further is configured to receive the third and fourth random access preambles, indicative of requests for sending data, from the first and second communication devices 110, 120, respectively. The arrangement 800 further is configured to send, to the first communication device 110, a random access response message including the third random access preamble, in response to the third random access preamble. The arrangement 800 further is configured to receive, from the first communication device 110, a first message including the first C-RNTI, in response to the random access response message. The arrangement 800 further is configured to send, to the first communication device 110, a contention resolution message, comprising the first C-RNTI assigned to the first communication device 110, which enables the first communication device 110 to determine whether it is allowed or not allowed to send data.

In some embodiments of the arrangement 800 in the radio network node 140, the radio communication system 100 further comprises a third communication device 130. The arrangement 800 further is configured to receive a fifth random access preamble from the third communication device 130. The arrangement 800 further is configured to assign a second C-RNTI to the third communication device 130. The arrangement 800 further is configured to assign the third random access preamble to the third communication device 130. Moreover, the arrangement 800 further is configured to send the random access response message including the third random access preamble to the third communication device 130. The arrangement 800 further is configured to receive, from the third communication device 130, a second message including the second C-RNTI, in response to the random access response message. Further, the arrangement 800 is configured to send the contention resolution message, comprising the first C-RNTI to the third communication device 130.

In some embodiments of the arrangement 800 in the radio network node 140, the arrangement 800 further is configured to associate a second C-RNTI to the second communication device 120, whereby a group of C-RNTIs, comprising the first and second C-RNTIs, are associated to the second communication device 120.

In some embodiments of the arrangement 800 in the radio network node 140, the first and second communication devices 110, 120 are associated to a first and a second long identifier, respectively. The first long identifier is different from the second long identifier. The arrangement 800 is further configured to receive a third and fourth random access preamble, indicative of requests for sending data, from the first and second communication devices 110, 120, respectively. The arrangement 800 is further configured to send, to the first and second communication devices 110, 120, a random access response message in response to the third and fourth random access preambles. The arrangement 800 is further configured to receive, from the first communication device 110, a first message including the first long identifier (1st long id.) in response to the random access response message. The arrangement 800 is further configured to receive, from the second communication device 120, a second message including the second long identifier (2nd long id.), in response to the random access response message. The arrangement 800 is further configured to send, to the first communication device 110, a first contention resolution message, comprising the first C-RNTI, which is to be assigned to the first communication device 110, and the first long identifier, which indicates to the first communication device 110 that it is allowed to send data. The arrangement 800 is further configured to send, to the second communication device 120, a second contention resolution message, comprising the second C-RNTI, which is to be assigned to the second communication device 120, and the second long identifier, which indicates to the second communication device 120 that it is allowed to send data.

In some embodiments of the arrangement 800 in the radio network node 140, the first and second communication devices 110, 120 are associated to a first and a second long identifier, respectively. The first long identifier is different from the second long identifier. The arrangement 800 is further configured to assign (or associate in some embodiments) a multi-user-C-RNTI (MC-RNTI) to the first and second communication devices 110, 120. The arrangement 800 is further configured to send a downlink message, including the multi-user-C-RNTI and the first long identifier, to the first and second communication devices 110, 120.

In some embodiments of the arrangement 800 in the radio network node 140, the arrangement 800 further is configured to configure a timer for the first and second communication devices 110, 120, respectively.

In the embodiments of the arrangement 800 above, when expressed as the arrangement 800 is configured to send, this may be realized by a sending unit 840, comprised in the arrangement 800. The sending unit 840, such as a transmitter, may thus be configured to perform the steps of sending described above.

In the embodiments of the arrangement 800 above, when expressed as the arrangement 800 is configured to receive, this may be realized by the receiving unit 810, such as a receiver. The receiving unit 810 may thus be configured to perform the steps of receiving described above.

Figure 9:
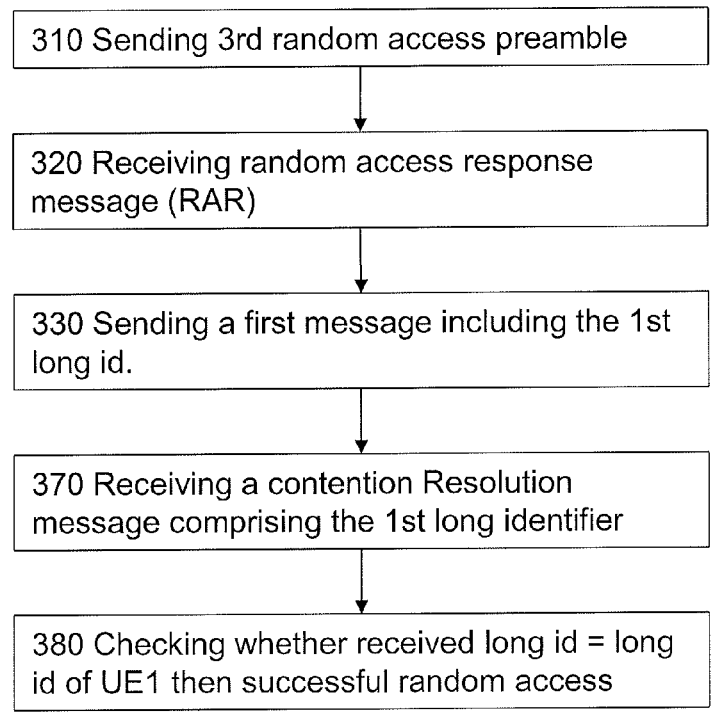
FIG. 9 shows a schematic flow chart of a method in a first communication device for enabling sharing of a first C-RNTI.

Now referring to FIG. 9, there is shown a schematic flow chart of an embodiment of a method in the first communication device 110 for enabling sharing of a first Cell Radio Network Temporary Identifier, referred to as "C-RNTI" between at least the first communication device 110 and a second communication device 120. A radio communication system 100 comprises a radio network node 140 and the first and second communication devices 110, 120. The first C-RNTI is assigned to the first and second communication devices 110, 120. The first and second communication devices 110, 120 are associated to a first and second long identifier, respectively. The first long identifier is different from the second long identifier. The following steps may be performed. Notably, in some embodiments of the method the order of the steps may differ from what is indicated below.

310 The first communication device 110 sends a third random access preamble, indicative of a request for sending data, to the radio network node 140. As an example, the third random access preamble may be sent in conjunction with a Scheduling Request (SR) on RACH or PUCCH (Physical Uplink Control Channel).

320 The first communication device 110 receives, from the radio network node 140, a random access response message in response to the third random access preambles.

330 The first communication device 110 sends, to the radio network node 140, a first message including the first long identifier in response to the random access response message.

340 The first communication device 110 receives, from the radio network node 140, a contention resolution message, comprising the first long identifier.

380 The first communication device 110 checks whether the received long identifier, comprised in the contention resolution message, is equal to the first long identifier assigned to the first communication device 110.

Figure 10:
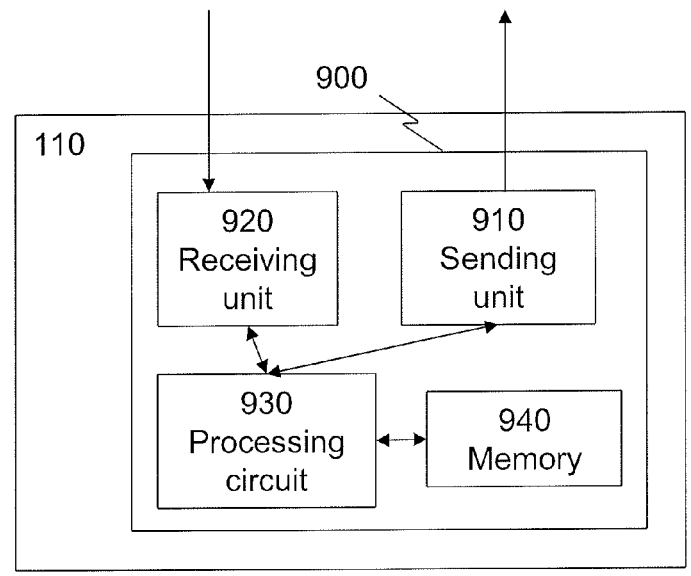
FIG. 10 shows a schematic, exemplifying block diagram of an embodiment of an arrangement 900 in a first communication device 110 for enabling sharing of a first C-RNTI.

In FIG. 10, there is shown a schematic, exemplifying block diagram of an embodiment of an arrangement 900 in a first communication device 110 for enabling sharing of a first Cell Radio Network Temporary Identifier, referred to as "C-RNTI" between at least the first communication device 110 and a second communication device 120. A radio communication system 100 comprises a radio network node 140 and the first and second communication devices 110, 120. The first C-RNTI is assigned to the first and second communication devices 110, 120. The first and second communication devices 110, 120 are associated to a first and second long identifier, respectively. The first long identifier is different from the second long identifier. The arrangement 900 may comprise a sending unit 910 configured to send a third random access preamble, indicative of a request for sending data, to the radio network node 140. The arrangement 900 further comprises a receiving unit 920 configured to receive, from the radio network node 140, a random access response message in response to the third random access preambles. Moreover, the sending unit 910, such as a transmitter, is further configured to send, to the radio network node 140, a first message including the first long identifier in response to the random access response message, and the receiving unit 920, such as a receiver, is further configured to receive, from the radio network node 140, a contention resolution message, comprising the first long identifier. Furthermore, the arrangement 900 comprises a processing circuit 930 configured to check whether the received long identifier, comprised in the contention resolution message, is equal to the first long identifier assigned to the first communication device 110. The processing circuit 930 may be a processing unit, a processor, an application specific integrated circuit (ASIC), a field-programmable gate array (FPGA) or the like. Moreover, the arrangement 900 may comprise a memory 940 for storing software to be executed by, for example, the processing circuit. The software may comprise instructions to enable the processor to perform the method described above.

Even though embodiments of the present invention have been described, many different alterations, modifications and the like will become apparent for those skilled in the art. The described embodiments are therefore not intended to limit the scope of the invention, which is defined by the appended claims.

The invention claimed is:

1. A method in a radio network node for sharing of a first Cell Radio Network Temporary Identifier (C-RNTI) between at least a first and a second communication device, wherein a radio communication system comprises the radio network node and the first and second communication devices, the method comprising:
    receiving a first random access preamble from the first communication device;
    associating the first C-RNTI to the first communication device, in response to the first random access preamble;
    receiving a second random access preamble from the second communication device; and
    associating the first C-RNTI to the second communication device, in response to the second random access preamble, while maintaining the association of the first C-RNTI to the first communication device, thereby sharing the first C-RNTI between said first and second communication devices.

2. The method of claim 1, wherein associating the first C-RNTI to the first communication device comprises assigning the first C-RNTI to the first communication device and associating the first C-RNTI to the second communication device comprises assigning the first C-RNTI to the second communication device while maintaining the assignment of the first C-RNTI to the first communication device, wherein the first and second communication devices are connected to the radio network node.

3. The method of claim 2, wherein the first and second communication devices are associated to a first long identifier and a second long identifier, respectively, wherein the first long identifier is different from the second long identifier, the method further comprising:
    receiving a third and a fourth random access preamble, indicative of requests for sending data, from the first and second communication devices, respectively;
    sending, to the first and second communication devices, a random access response message in response to the third and fourth random access preambles;
    receiving, from the first communication device, a first message including the first long identifier in response to the random access response message;
    receiving, from the second communication device, a second message including the second long identifier, in response to the random access response message; and
    sending, to the first and second communication devices, a contention resolution message, comprising the first long identifier, thereby allowing the first communication device to send data.

4. The method of claim 2, further comprising
    assigning a third and a fourth random access preamble to the first and second communication devices, respectively, wherein the third random access preamble is different from the fourth random access preamble;
    receiving the third and fourth random access preambles, indicative of requests for sending data, from the first and second communication devices, respectively;
    sending, to the first communication device, a random access response message including the third random access preamble, in response the third random access preamble;
    receiving, from the first communication device, a first message including the first C-RNTI, in response to the random access response message; and
    sending, to the first communication device, a contention resolution message, comprising the first C-RNTI, thereby allowing the first communication device to send data.

5. The method of claim 4, wherein the radio communication system further comprises a third communication device, wherein the method further comprises:

receiving a fifth random access preamble from the third communication device;

assigning a second C-RNTI to the third communication device; and assigning the third random access preamble to the third communication device, whereby the third random access preamble is assigned to the first and third communication devices, wherein the random access response message including the third random access preamble further is sent to the third communication device, the method further comprising:

receiving, from the third communication device, a second message including the second C-RNTI, in response to the random access response message; and further sending the contention resolution message comprising the first C-RNTI to the third communication device, thereby disallowing the third communication device to send data.

6. The method of claim 1, further comprising associating a second C-RNTI to the second communication device, whereby a group of C-RNTIs, comprising the first and second C-RNTIs, are associated to the second communication device.

7. The method of claim 6, wherein the first and second communication devices are associated to a first and second long identifier, respectively, wherein the first long identifier is different from the second long identifier, the method further comprising:

receiving a third and a fourth random access preamble, indicative of requests for sending data, from the first and second communication devices, respectively;

sending, to the first and second communication devices, a random access response message in response to the third and fourth random access preambles;

receiving, from the first communication device, a first message including the first long identifier in response to the random access response message;

receiving, from the second communication device, a second message including the second long identifier, in response to the random access response message;

sending, to the first communication device, a first contention resolution message, comprising the first C-RNTI, which is to be assigned to the first communication device, and the first long identifier, which indicates to the first communication device that it is allowed to send data; and sending, to the second communication device, a second contention resolution message, comprising the second C-RNTI, which is to be assigned to the second communication device, and the second long identifier, which indicates to the second communication device that it is allowed to send data.

8. The method of claim 1, wherein the first and second communication devices are associated to a first and a second long identifier, respectively, wherein the first long identifier is different from the second long identifier, further comprising:

assigning a multi-user-C-RNTI to the first and second communication devices;

sending, to the first and second communication devices, a downlink message, including the multi-user-C-RNTI assigned to the first or second communication device and the first long identifier, thereby indicating to the first communication device that the downlink message was intended to it.

9. The method of claim 8, wherein the multi-user-C-RNTI comprises P-RNTI.

10. The method of claim 1, further comprising configuring a timer for the first and second communication devices, respectively, wherein the timer is indicative of when the communication device is obliged to refrain from using the C-RNTI.

11. An arrangement in a radio network node for sharing of a first Cell Radio Network Temporary Identifier (C-RNTI) between a first and a second communication device, wherein a radio communication system comprises the radio network node and the first and second communication devices, the arrangement comprising a receiving unit configured to receive a first random access preamble from the first communication device, a processing circuit configured to associate the first C-RNTI to the first communication device, in response to the first random access preamble, wherein the receiving unit is further configured to receive a second random access preamble from the second communication device, and the processing circuit is further configured to associate the first C-RNTI to the second communication device, in response to the second random access preamble, while the association of the first C-RNTI to the first communication device is maintained, whereby the first C-RNTI is shared between said first and second communication devices.

12. A method in a first communication device for enabling sharing of a first Cell Radio Network Temporary Identifier (C-RNTI) between at least the first communication device and a second communication device, wherein a radio communication system comprises a radio network node and the first and second communication devices, wherein the first C-RNTI is assigned to the first and second communication devices, wherein the first and second communication devices are associated to a first and second long identifier, respectively, wherein the first long identifier is different from the second long identifier, the method comprising:

sending a third random access preamble, indicative of a request for sending data, to the radio network node;

receiving, from the radio network node, a random access response message in response to the third random access preambles;

sending, to the radio network node, a first message including the first long identifier in response to the random access response message;

receiving, from the radio network node, a contention resolution message, comprising the first long identifier; and checking whether the received long identifier, comprised in the contention resolution message, is equal to the first long identifier assigned to the first communication device.

13. An arrangement in a first communication device for enabling sharing of a first Cell Radio Network Temporary Identifier (C-RNTI) between at least the first communication device and a second communication device, wherein a radio communication system comprises a radio network node and the first and second communication devices, wherein the first C-RNTI is assigned to the first and second communication devices, wherein the first and second communication devices are associated to a first and second long identifier, respectively, wherein the first long identifier is different from the second long identifier, the arrangement comprising:

a sending unit configured to send a third random access preamble, indicative of a request for sending data, to the radio network node;

a receiving unit configured to receive, from the radio network node, a random access response message in response to the third random access preambles; wherein the sending unit further is configured to send, to the radio network node, a first message including the first long identifier in response to the random access response message; and the receiving unit further is configured to receive, from the radio network node, a contention resolution message, comprising the first long identifier; and a processing circuit configured to check whether the received long identifier, comprised in the contention resolution message, is equal to the first long identifier assigned to the first communication device.

* * * * *